United States Patent Office 3,366,684
Patented Jan. 30, 1968

3,366,684
REDUCTIVE ALKYLATION CATALYST
William Budd, Cuyahoga Falls, Ohio, assignor to The Goodyear Tire & Rubber Company, Akron, Ohio, a corporation of Ohio
No Drawing. Filed Jan. 18, 1965, Ser. No. 426,408
7 Claims. (Cl. 260—576)

ABSTRACT OF THE DISCLOSURE

A two component catalyst system which increases yields in reductive alkylation reactions without promoting undesirable side reactions comprising a nickel catalyst and sulfur containing compounds.

---

This invention relates to new and highly effective catalytic compositions. More particularly the invention relates to catalytic compositions that are useful in catalyzing a reductive alkylation reaction.

A reductive alkylation reaction such as takes place between an amine, nitro or nitroso compound when reacted with an aldehyde or ketone in the presence of hydrogen is commonly employed to produce N-alkyl substituted amines. Such reductive alkylation reactions are known to be catalyzed by certain metallic catalysts. However, many of the previously known metallic catalysts that are reasonably effective in promoting a reductive alkylation reaction have a tendency to also promote one or more undesirable side reactions. For example, a reductive alkylation reaction employing an amine, hydrogen and an aldehyde or ketone frequently results in the reduction of a substantial portion of the aldehyde or ketone to the corresponding alcohol. Another undesirable competing reaction when the nitro, nitroso or amine employed is an aryl compound is the reduction of the aromatic ring.

It is therefore an object of this invention to provide an improved and highly effective catalytic system for catalyzing a reductive alkylation reaction. It is another object of this invention to provide a reductive alkylation catalyst that will produce a high yield of the desired N-alkyl substituted amine without promoting undesirable side reactions and in particular the reduction of the aldehyde or ketone alkylating agent to the corresponding alcohol. It is a further object of this invention to provide an improved process for producing a high yield of N-alkyl substituted amines.

In accordance with the present invention a nickel catalyst that may be utilized in the form of the concentrated metal or as nickel dispersed on an inert carrier material is modified by the employment of free sulfur or sulfur containing compounds to produce an unexpectedly effective catalytic composition for the reductive alkylation of nitro, nitroso or amine compounds. Nickel catalysts broadly may be modified in accordance with the present invention to produce improved catalytic compositions. The term "nickel catalyst" as employed throughout this specification and in the accompanying claims includes the following materials:

(1) Relatively pure metallic nickel that may be in finely subdivided form;

(2) Metallic nickel further modified with small amounts of other metals such as cobalt, chromium and zirconium; and (3) Metallic nickel in pure form or modified with small amounts of other metals supported on an inert carrier such as kieselguhr, charcoal, clays, alumina, etc.

The sulfur containing materials that may be effectively employed as modifier for the above described nickel catalyst include free sulfur and any sulfur containing compound. Examples of suitable sulfur containing compounds that may be employed as catalyst modifiers include:

mercaptans
sulfenyl thiocyanates
sulfenamides
sulfenic esters
sulfenic anhydrides
thiophosphites
thiophosphates
thio ortho esters
alkyl thio sulfates
thio sulfonic esters
thio sulfinic esters
thio sulfite esters
hydroxy mercaptans
alkoxy mercaptans
cyano mercaptans
aldehyde mercaptans
keto mercaptans
sulfide mercaptans
amino mercaptans
mercapto acids
organic sulfides
inorganic sulfides
hydroxy disulfides
amino disulfides
aldehyde sulfides
keto sulfides
thio amines
cyano sulfides
heterocyclic compounds containing ring sulfur
thiones
sulfide acids
disulfide acids
mercaptals
mercaptoles
disulfides
polysulfides
amine disulfides
thio acids
thiol esters
thion esters
thio anhydrides
dithio acids
thio ortho esters
thio amides
thiol carbonic esters
thion carbonic esters
dithio carbonic esters
dithiol carbonic esters
dithiol carbonic salts
trithio carbonic esters
trithio carbonic salts
thiol-carbamic esters
thion carbamic esters
dithio carbamic acid esters
thiol carbazates
thiuram monosulfides
thiuram disulfides
thiuram polysulfides
thioureas
isothiuronium salts
thiols
thio semi carbazide
thio carbazone
organic sulfates
inorganic sulfates
sulfur halides
sulfur acid halides
organic sulfoxides
organic sulfones In addition to the above classes of compounds that may be effectively employed as catalysts modifiers there can also be employed as suitable modifiers any compounds that contain a multiplicity of any of the above characteristic groupings.

The preferred nickel catalyst modifiers include sulfur and the following classes of sulfur-containing compounds:

thioureas
sulfide acids
mercapto acids
thio amides
disulfide acids
thiuram disulfides
mercaptans of heterocyclics containing ring sulfur
disulfides of heterocyclics containing ring sulfur
heterocyclics containing ring sulfur
disulfides
cyano sulfides
sulfoxides
thio acids
sulfides
mercaptans
dithio acids
sulfides of heterocyclics containing ring sulfur
sulfide acid esters The most preferred nickel catalyst modifiers that may be employed in accordance with the present invention are those compounds which when employed as nickel catalyst modifiers produced a modified catalyst that is effective in catalyzing a reductive alkylation reaction to give at least an 85 percent yield of the desired N-alkyl substituted amine compounds. These most preferred modifiers include sulfur and the following classes of sulfur-containing compounds:

sulfide acids
mercapto acids
sulfide acid esters
thiuram disulfide
heterocyclics containing ring sulfur
cyano sulfides
sulfoxides
sulfides
dithio acids The most highly preferred nickel catalyst modifiers that may be employed in accordance with the present invention are ditertiarybutyl-sulfide and thio dipropionitrile.

Any of the aldehydes and ketones that are normally employed in a conventional reductive alkylation type reaction may be employed in the practice of this invention. Typical examples of suitable aldehydes and ketones include methyl ethyl ketone, methyl isobutyl ketone, methyl hexyl ketone, butyl aldehyde and benzaldehyde.

The amine or amine precursors that are useful in carrying out reactions of the type contemplated by the present invention are any of the primary amines or amine precursors that will produce primary amines of the type normally employed in a conventional reductive alkylation reaction. Typical examples of suitable amines or amine precursors include aniline, para-nitrodiphenylamine, paraminodiphenylamine, ortho-phenylenediamine and para-nitrosodiphenylamine.

The amount of sulfur-containing material that should be used to modify the nickel catalyst will vary somewhat depending upon the particular reductive alkylation reaction in which the catalyst is to be employed and the sulfur modifier used to modify the catalyst. However, it will in general be found that from 0.10 to 4.00 grams of contained sulfur should be employed per 100 grams of nickel in the metallic catalyst. The sulfur modifier may be physically mixed with the nickel catalyst in the above recommended proportions and introduced directly to the reaction mixture wherein the catalyst is to be employed as a reductive alkylation catalyst. Such a physical mixture may be conveniently prepared by dispersing both the nickel catalyst and modifier in inert solvents, mixing the two dispersions and then removing the solvent to give a uniformly modified nickel catalyst. Examples of suitable solvents in which these materials may be dispersed include methanol, ethanol, hexane, toluene and water. Alternatively, the sulfur-containing modifiers and nickel catalyst can be added separately in the above described proportions to the reaction mixture. Where the nickel catalyst and modifier are introduced separately to the reaction it will frequently be found advantageous to add the modifier as a solution in an inert solvent such as described above. The reductive alkylation reaction is normally conducted at temperatures between 50 and 240° C. At this temperature range the sulfur modifiers appear to react or at least become dispersed on the surface of the nickel catalyst and thus produce an effective catalytic system by the time the reactants reach a sufficiently high temperature to permit substantial reaction to take place. Since a reductive alkylation reaction employs hydrogen it is necessary to conduct the reaction under substantial pressure. Normal pressures employed generally range from 250 to 2,000 pounds per square inch, but in some cases may be substantially higher in the range of 4,000 to 5,000 pounds per square inch.

In order to most effectively catalyze a reductive alkylation reaction the modified catalysts of this invention are employed in an amount from 0.5 to 8 grams, based on the weight of contained nickel, per mol of primary amine in the reaction mixture.

In carrying out a reductive alkylation reaction wherein the modified catalysts of this invention are conveniently employed the amine, nitro or nitroso compound is charged into a suitable reactor with an aldehyde or ketone that is to be employed as the alkylating agent and a modified nickel catalyst as has been described above. The mixture is heated to a reaction temperature in the range between 50 and 240° C. and hydrogen under pressure of from 250 to 2,000 pounds per square inch is then introduced to the reaction vessel. The reaction is permitted to proceed for a period of time sufficient to obtain conversion of the reactants to the N-alkyl substituted amine. The pressure on the reaction vessel is then released and the product is recovered by distilling off the volatile materials. The employment of the modified catalysts of this invention enables the reaction to be conducted at comparatively high temperatures where is proceeds readily without any significant conversion of the aldehyde or ketone alkylating agent to its corresponding alcohol. Reductive alkylation reactions of the type described may be carried out on either a batch or continuous basis. The aldehyde or ketone alkylating agent is normally employed in excess and acts as a solvent for the reactants and thus alleviates the necessity of other solvent diluents being employed in the reaction.

The preparation of the sulfur modified nickel catalysts of this invention and their employment in a reductive alkylation reaction is deconstrated by the following examples which should be considered as specific embodiments of the invention but should not be interpreted as limitations thereof.

*Example 1*

Into a one liter autoclave equipped with stirrer was charged 138 grams of distilled para-amino diphenylamine, 300 grams of methyl isobutylketone and two grams of a 63 percent nickel on kieselguhr catalyst.*
This reaction was run for four hours at 165° C. under hydrogen at 750 to 1,000 pounds per square inch pressure. The resulting product was then removed from the autoclave and filtered. It was then distilled to 205° C. pot temperature at 20 millimeters of mercury. Analysis of volatiles and product was conducted by gas chroma- ---
* Available commercially from Chemetron Corporation under the designation G-49-A.

tography. The volatiles showed 26.6 percent of the original ketones charged had been reduced to the corresponding alcohol. Analysis of the product showed a 57.8 percent yield of N-4-methyl-2-pentyl-N'-phenyl-p-phenylenediamine.

*Examples 2 through 31*

Various catalyst modifiers were evaluated in the production of N - 4 - methyl-2-pentyl-N'-phenyl-p-phenylene-diamine using the same concentration of reactants and catalysts and the same experimental conditions as described in Example 1 above. The modifiers were added to the reaction mixture either as a solution or as a solid as indicated in column 2 of the following table wherein the effectiveness of various catalyst systems is summarized.

| Example No. | Catalyst Modifier | Solid or Solution | Grams Modifiers per Gram Catalyst | Percent Yield [1] | Percent of Ketone Reduced to Alcohol |
|---|---|---|---|---|---|
| 1 | None (Example 1) | | | 57.8 | 26.6 |
| 2 | Thiourea | Alc. sol.[2] | 0.011 | 84.3 | 2.8 |
| 3 | Thiodipropionic acid | Alc. sol.[2] | 0.0129 | 89.3 | 4.6 |
| 4 | Thiomalic acid | Alc. sol.[2] | 0.0109 | 74.5 | 0.6 |
| 5 | Di-iso-octylthio dipropionate | Alc. sol.[2] | 0.0582 | 86.0 | 3.0 |
| 6 | Thiobenzanilide | Alc. sol.[2] | 0.0308 | 72.0 | 4.4 |
| 7 | Dithiodibenzoic acid | Solid | 0.0410 | 91.1 | 2.6 |
| 8 | Tetramethyl thiuram monosulfide | do | 0.015 | 79.0 | 3.0 |
| 9 | Mercaptobenzothiazole | do | 0.0240 | 77.5 | 1.1 |
| 10 | Benzothiazole disulfide | do | 0.0240 | 82.4 | 1.7 |
| 11 | Benzothiazole monosulfide | do | 0.0290 | 83.0 | 1.3 |
| 12 | 1,3 Propane sultone | Methanol solution | 0.030 | 68.0 | 13.4 |
| 13 | Benzyl disulfide | Solid | 0.018 | 84.0 | 5.3 |
| 14 | Sulfur | do | 0.0138 | 92.4 | 2.6 |
| 15 | Benzothiazole | Methanol solution | 0.020 | 92.5 | 9.4 |
| 16 | β-Mercapto propionic acid | do | 0.0154 | 93.5 | 14.8 |
| 17 | Thiodipropionitrile | do | 0.0206 | 97.4 | 2.9 |
| 18 | N-butyl sulfoxide | do | 0.0234 | 80.7 | 5.5 |
| 19 | Thiobenzoic acid | do | 0.020 | 81.5 | 4.0 |
| 20 | S-alkyl (C-6) mercapto propionic acid | do | 0.0284 | 94.5 | 5.9 |
| 21 | Thio anisole | do | 0.0180 | 93.8 | 4.2 |
| 22 | 4-methyl thio phenol | do | 0.0178 | 83.8 | 6.1 |
| 23 | Di-tert.-butyl sulfide | do | 0.0211 | 97.3 | 5.3 |
| 24 | Xylene monosulfide | do | 0.0331 | 93.8 | 2.6 |
| 25 | Tetramethyl thiuram disulfide | Solid | 0.0179 | 89.2 | 3.7 |
| 26 | Sulfur dichloride | Benzene solution | 0.015 | 88.5 | 0.6 |
| 27 | Sodium sulfide | Solid | 0.0110 | 61.6 | 17.1 |
| 28 | Morpholine disulfide | do | 0.0168 | 83.7 | 5.5 |
| 29 | Sulfuryl chloride | Benzene solution | 0.0196 | 66.5 | 9.7 |
| 30 | Benzene sulfonyl chloride | do | 0.0256 | 74.5 | 6.4 |
| 31 | Dimethyl sulfoxide | do | 0.0113 | 94.1 | 3.2 |

[1] N-4-methyl-2-pentyl-N'-phenyl-p-phenylenediamine.
[2] Absolute ethyl alcohol solution.

*Example 32*

Into a one liter autoclave equipped with stirrer was charged 184 grams of distilled p-aminodiphenylamine, 288 grams of methyl ethyl ketone and two grams of a 63 percent nickel on kieselguhr catalyst. This reaction was run for four hours at 160° C. under hydrogen at 750 to 1000 pounds per square inch pressure. The resulting product was then removed from the autoclave and filtered. It was then distilled to 205° C. pot temperature at 25 millimeters of mercury. Analysis of volatiles and product was conducted by gas chromatography. The analysis of th evolatiles showed that 42.0 percent of the original ketone charged had been reduced to the alcohol. Analysis of the product showed a 78.0 percent yield of N-sec. butyl-N'-phenyl-p-phenylenediamine.

*Example 33*

This example was conducted using the same proportions of reactants and the same experimental conditions as described in Example 32 except 4 milliliters of a methanol solution of thio-dipropionic acid containing 0.0129 gram per milliliter (0.0258 gram modifier per gram of catalyst) was added to the charge. Analysis of the volatiles showed that 8.1 percent of the ketone originally charged had been reduced to the alcohol. Analysis of the product showed a 100 percent yield of N-sec.-butyl-N'-phenyl-p-phenylenediamine.

*Example 34*

Into a one liter autoclave equipped with stirrer was charged 138 grams of distilled p-amino diphenylamine, 384 grams of 2-octanone, and 2 grams of a 63 percent nickel on kieselguhr catalyst. The reaction was run for 4 hours at 165° C. under hydrogen at 750 to 1000 pounds per square inch pressure. The resulting product was then removed from the autoclave and filtered. It was then distilled to 205° C. pot temperature at 25 millimeters of mercury. Analysis of the volatiles showed that 33.7 percent of the ketone originally charged had been reduced to the alcohol. Analysis of the product showed a yield of 87.7 percent of N-2-octyl-N'-phenyl-p-phenylenediamine.

*Example 35*

This example was conducted using the same proportions of reactants and the same experimental conditions as described in Example 34 except 4 milliliters of a methanol solution of thiodipropionic acid containing 0.0129 gram per milliliter (0.0258 gram of modifier per gram of catalyst) was added to the charge. Analysis of the volatiles showed 9.7 percent of the ketone originally charged had been reduced to the alcohol. Analysis of the product showed a 100 percent yield of N-2-octyl-N'-phenyl-p-phenylenediamine.

*Example 36*

Into a one liter autoclave equipped with stirrer was charged 93 grams of aniline, 400 grams methyl isobutyl ketone and 2 grams of a 63 percent nickel on kieselguhr catalyst. The reaction was run for 4 hours at 165° C. under 750 to 1000 pounds per square inch hydrogen pressure. The resulting product was removed from the autoclave and filtered. It was then distilled, taking the fraction boiling at 100 to 125° C. at 13 millimeters of mercury. This product weighed 78 grams, representing a 44.1 percent yield of N-4-methyl-2-butyl aniline. Analysis of the volatile fraction boiling up to 200° C. pot temperature at atmospheric pressure showed that 35.4 percent of the original ketone had been reduced to the alcohol.

*Example 37*

This example was conducted using the same proportions of reactants and the same experimental conditions as described in Example 36 except that 2 milliliters of a methanol solution of thiodipropionic acid containing 0.0258 gram per milliliter was added to the charge (0.0258 gram of modifier per gram of catalyst). Yield of 46.3 percent of N-4-methyl-2-butyl aniline was obtained. Analysis of the volatiles showed that 4.1 percent of the original ketone had been reduced to the alcohol.

Example 38

Into a one liter autoclave equipped with stirrer was charged 54 grams of p-phenylene diamine, 400 grams of 2-octanone and 2 grams of a 63 percent nickel on kieselguhr catalyst. The reaction was run for 4 hours at 165° C. under 750 to 1000 pounds per square inch of hydrogen pressure. The resulting product was removed from the autoclave and filtered. The product was distilled taking the fraction boiling up to 109° C. at 13 millimeters as the volatiles and the fraction boiling at 155 to 195° C. at 0.3 millimeter as the product. A yield of 57.2 percent, N,N'-di-2-octyl-p-phenylenediamine was obtained. Analysis of the volatiles showed that 32.0 percent of the original ketone had been reduced to the alcohol.

Example 39

This example was conducted using the same proportions of reactants and the same experimental conditions as described in Example 38 except 2 milliliters of a methanol solution of thiodipropionic acid containing 0.0258 gram per milliliter (0.0258 gram modifier per gram of catalyst) was added to the charge. A yield of 88.6 percent of N,N'-di-2-octyl-p-phenylenediamine was obtained. Analysis of the volatiles showed that 13.5 percent of the original ketone had been reduced to the alcohol.

Example 40

Into a one liter autoclave equipped with stirrer was charged 138 grams of distilled p-amino diphenylamine, 300 grams of methyl isobutyl ketone and 2 grams of a cobalt modified nickel on kieselguhr catalyst. This was run for 4 hours at 165° C. under 750 to 1000 pounds per square inch of hydrogen pressure. The resulting product was removed from the autoclave and filtered. The product was distilled up to 205° C. pot temperature at 13 millimeters pressure. The volatiles and product were analyzed by gas chromatography. Analysis of the volatiles showed 26.5 percent of the original ketone had been reduced to the alcohol. Analysis of the product showed a yield of 62.8 percent of N-4-methyl-2-pentyl-N'-phenyl-p-phenylenediamine.

Example 41

This example was conducted using the same proportions of reactants and the same experimental conditions as described in Example 40 except for 2 milliliters of a methanol solution of thiodipropionic acid containing 0.0258 gram per milliliter (0.0258 gram modifier per gram of catalyst) was added to the charge. Analysis of the volatiles showed that 6.5 percent of the original ketone had been reduced to the alcohol. Analysis of the product showed a yield of 95.3 percent of N-4-methyl-2-pentyl-N'-phenyl-p-phenylenediamine.

Example 42

Into a one liter autoclave equipped with stirrer was charged 175 grams of distilled p-nitrodiphenylamine, 295 grams of methyl ethyl ketone and 2 grams of a 63 percent nickel on kieselguhr catalyst. This was run for 5 hours at 165° C. under 750 to 1000 pounds per square inch of hydrogen pressure except during an initial exothermic period when the temperature rose to 172° C. and the pressure was lower. The resulting product was removed from the autoclave and filtered. The product was distilled up to 205° C. pot temperature at 13 millimeters of mercury. The volatiles and product were analyzed by gas chromatography. Analysis of the volatiles showed that 27.5 percent of the ketone had been reduced to the alcohol. Analysis of the product showed a yield of 60.0 percent of N-sec.-butyl-N'-phenyl-p-phenylenediamine.

Example 43

This example was conducted using the same proportions of reactants and the same experimental conditions as described in Example 42 except that 2 milliliters of a methanol solution containing 0.0258 gram per milliliter of thiodipropionic acid (0.0258 gram modifier per gram of catalyst) was added to the charge. Analysis of the volatiles showed that 5.5 percent of the ketone had been reduced to the alcohol. Analysis of the product showed a yield of 94.0 percent of N-sec.-butyl-N'-phenyl-p-phenylenediamine.

Example 44

A premodified catalyst was prepared as follows: Three grams of a 63 percent nickel on kieselguhr catalyst was suspended in 10 milliliters of water and 6 milliliters of an aqueous solution containing 0.0205 gram per milliliter of sodium sulfate (0.041 gram of modifier per gram of catalyst) was added in 2 milliliter portions. The slurry was mixed well after each addition. It was dried overnight under vacuum.

Into a one liter autoclave equipped with stirrer was charged 138 grams of distilled p-amino diphenylamine, 300 grams methyl isobutyl ketone and 2 grams of the premodified catalyst. This was run for 4 hours at 165° C. under 750 to 1000 pounds per square inch of hydrogen. The resulting product was removed from the autoclave and filtered. The product was distilled up to 205° C. pot temperature at 25 millimeters of pressure. Analysis of the volatile fraction showed that 11.0 per cent of the ketone originally charged had been reduced to the alcohol. Analysis of the product showed a yield of 77.2 percent of N-4-methyl - 2 - pentyl-N'-phenyl-p-phenylenediamine.

Example 45

A premodified catalyst was prepared as follows: Three grams of a 63 percent nickel on kieselguhr catalyst was slurried in 10 milliliters of methanol and 3 milliliters of a methanol-methyl isobutyl ketone solution containing 0.0331 gram per liter of xylene monosulfide (0.0331 gram modifier per gram of catalyst) was added in one milliliter portions. The slurry was well mixed after each addition and then allowed to stand one hour at room temperature. It was dried overnight under vacuum.

Into a one liter autoclave equipped with stirrer was charged 138 grams of distilled p-aminodiphenylamine, 300 grams of methyl isobutyl ketone and 2 grams of the premodified catalyst above. This was run for 4 hours at 165° C. under 750 to 1000 pounds per square inch of hydrogen. The resulting product was removed from the autoclave and filtered. It was distilled up to 205° C. pot temperature at 25 millimeters pressure. Analysis of the volatiles showed that 1.9 percent of the original ketone had been reduced to the alcohol. Analysis of the product showed a yield of 95.8 percent of the N-4-methyl-2-pentyl-N'-phenyl-p-phenylenediamine.

Example 46

A premodified catalyst was prepared as in Example 45 except 6 milliliters of a methanol solution containing 0.0129 gram per milliliter of thiodipropionic acid (0.0258 gram of modifier per gram of catalyst) was added in 2 milliliter portions instead of the xylene monosulfide.

Into a one liter autoclave equipped with stirrer was charged 138 grams of distilled p-aminodiphenylamine, 300 grams methyl isobutyl ketone and 2 grams of the above premodified catalyst. The materials were reacted for 4 hours at 165° C. under 750 to 1000 pounds per square inch of hydrogen. The resulting product was removed from the autoclave and filtered. The product was distilled up to 205° C. pot temperature at 25 millimeters pressure. Analysis of the volatiles showed that 3.4 percent of the original ketone had been reduced to the alcohol. Analysis of the product showed a yield of 93.9 percent of N-4-methyl-2-pentyl-N'-phenyl-p-phenyldiamine.

Example 47

Into a suitable pressure reaction vessel was charged 2323 grams of p-aminodiphenylamine (purity 98.5 percent), 2884 grams of acetone and 12.5 grams of a nickel on kieselguhr catalyst, containing approximately 62.5 percent nickel (available commercially under the designation Girdler G–49–A) and modified with 0.161 gram of thiourea. This reaction mixture was gradually heated to a temperature of 185° C. and hydrogen introduced to the reaction vessel to obtain a pressure of 900 pounds per square inch. The reaction mixture was constantly agitated at 185° C. for 120 minutes. A yield of 90.3 percent of N-isopropyl-N'-phenyl-p-phenylenediamine was obtained. This product was analyzed and found to be 100 percent pure.

While certain representative embodiments and details have been shown for the purpose of illustrating the invention it will be apparent to those skilled in this art that various changes and modifications may be made therein without departing from the spirit or scope of the invention.

What I claim is:

1. In the process of producing an N-alkyl substituted secondary amine by reacting a material selected from the group consisting of primary amine compounds, nitro compounds and nitroso compounds with a material selected from the group consisting of aldehydes and ketones in the presence of hydrogen the improvement wherein the reaction is conducted in the presence of a catalytic amount of a catalytic system composed of a nickel catalyst and a sulfur containing material selected from the group consisting of free sulfur and a sulfur containing compound, said sulfur containing material being employed in an amount to yield from 0.10 to 4.00 grams of contained sulfur per 100 grams of nickel.

2. In the process of producing an N-alkyl substituted secondary amine by reacting a material selected from the group consisting of primary amine compounds, nitro compounds and nitroso compounds with a material selected from the group consisting of aldehydes and ketones in the presence of hydrogen the improvement wherein the reaction is catalyzed by introducing to the reaction mixture separate dispersions of (1) a nickel catalyst and (2) a nickel catalyst modifier in an inert solvent, said modifier being selected from the group consisting of free sulfur and a sulfur containing compound, said modifier being employed in an amount to yield from 0.10 to 4.00 grams of contained sulfur per 100 grams of nickel.

3. In a process according to claim 1 the improvement wherein the reaction is conducted in the presence of a catalytic amount of a catalytic system composed of a nickel catalyst and a sulfur-containing material selected from the group consisting of free sulfur, mercaptans, sulfenyl thiocyanates, sulfenic esters, organic sulfides, inorganic sulfides, thio amines, heterocyclic compounds containing ring sulfur, thiones, thio acids, thiol esters, thion esters, thio anhydrides, thio amides, dithiol carbonic salts, trithio carbonic salts, thiol carbazates, thioureas, isothuronium salts, thials, thio semi carbazide, thio carbazone, organic sulfates, inorganic sulfates, sulfur halides, sulfur acid halides, organic sulfoxides and organic sulfones, said sulfur containing material being employed in an amount to yield from 0.10 to 4.0 grams of contained sulfur per 100 grams of nickel.

4. In a process according to claim 1 the improvement wherein the reaction is conducted in the presence of a catalytic amount of a catalytic system composed of a nickel catalyst and a sulfur-containing material selected from the group consisting of free sulfur, thioureas, thio amides, heterocyclics containing ring sulfur, sulfoxides, thio acids, sulfides, mercaptans, and sulfide acid esters, said sulfur containing material being employed in an amount to yield from 0.10 to 4.0 grams of contained sulfur per 100 grams of nickel.

5. In a process according to claim 1 the improvement wherein the reaction is conducted in the presence of a catalytic amount of a catalytic system composed of a nickel catalyst and a sulfur containing material selected from the group consisting of free sulfur, mercapto acids, sulfide acid esters, heterocyclics containing ring sulfur, sulfoxides, sulfides and dithio acids, said sulfur containing materials being employed in an amount to yield from 0.10 to 4.0 grams of contained sulfur per 100 grams of nickel.

6. A catalytic system comprising (1) a nickel catalyst and (2) ditertiarybutylsulfide to give from 0.10 to 4.00 grams of contained sulfur per 100 grams of nickel.

7. A catalytic system comprising (1) a nickel catalyst and (2) thiodipropionitrile to give from 0.10 to 4.00 grams of contained sulfur per 100 grams of nickel.

References Cited
UNITED STATES PATENTS

| | | | |
|---|---|---|---|
| 2,256,189 | 9/1941 | Bogemann et al. | 260—576 |
| 2,468,799 | 5/1949 | Ziels et al. | 252—430 |
| 3,234,281 | 2/1966 | Gaydasch et al. | 260—576 |

DANIEL E. WYMAN, Primary Examiner.

L. G. XIARHOS, L. G. MANDONI, Assistant Examiners.

UNITED STATES PATENT OFFICE
CERTIFICATE OF CORRECTION

Patent No. 3,366,684 January 30, 1968

William Budd

It is certified that error appears in the above identified patent and that said Letters Patent are hereby corrected as shown below:

Column 4, line 46, "is" should read -- it --; line 57, "deconstrated" should read -- demonstrated --. Column 5, in the table second column line 27 thereof, "disulife" should read -- disulfide --; line 49, "160°" should read -- 165° --; line 55, "th evolatiles" should read -- the volatiles --. Column 7, line 68, "27.5" should read -- 25.7 --. Column 8, line 70, "phenyldiamine" should read -- phenylenediamine --.

Signed and sealed this 24th day of March 1970.

(SEAL)
Attest:

Edward M. Fletcher, Jr.

Attesting Officer

WILLIAM E. SCHUYLER, JR.

Commissioner of Patents